United States Patent [19]

Freyman

[11] 4,357,675

[45] Nov. 2, 1982

[54] RIPPLE-CARRY GENERATING CIRCUIT WITH CARRY REGENERATION

[75] Inventor: Ronald L. Freyman, Bethlehem, Pa.

[73] Assignee: Bell Telephone Laboratories, Incorporated, Murray Hill, N.J.

[21] Appl. No.: 175,056

[22] Filed: Aug. 4, 1980

[51] Int. Cl.³ .............................................. G06F 7/50
[52] U.S. Cl. .................................................. 364/786
[58] Field of Search ................... 364/786; 307/200 B, 307/443, 575, 577; 365/222

[56] References Cited

U.S. PATENT DOCUMENTS

| | | | |
|---|---|---|---|
| 3,278,735 | 10/1966 | Brastins | 364/786 |
| 3,743,824 | 7/1973 | Smith | 364/788 |
| 3,757,308 | 9/1973 | Fosdick | 364/786 X |
| 3,843,876 | 10/1974 | Fette et al. | 364/786 |
| 3,932,734 | 1/1976 | Parsons | 364/786 |
| 3,956,640 | 5/1976 | Rubinstein | 307/205 |
| 4,052,604 | 10/1977 | Maitland et al. | 364/786 |
| 4,135,104 | 1/1979 | Allen | 307/443 |

*Primary Examiner*—Jerry Smith
*Attorney, Agent, or Firm*—Arthur J. Torsiglieri

[57] ABSTRACT

A chain-type ripple-carry generating circuit having a plurality of cascaded stages is provided with a regeneration network in each stage for restoring the logic level of a carry signal propagating through the stage. In one embodiment of the invention the regeneration network is designed to restore a carry-not bit and comprises an MOS transistor having its conduction channel coupled between the input of the stage and a ground terminal, the gate of the transistor being driven by a two-input NOR gate, one input of the NOR gate being connected to receive a precharge clock signal and the other input being connected to the input of the stage. When the precharge clock signal is at a logic "0" level and the input of the stage receives a carry-not bit at a logic "0" level, the NOR gate drives the MOS transistor into conduction causing the input of the stage to be pulled to substantially ground potential.

3 Claims, 3 Drawing Figures

RIPPLE-CARRY GENERATING CIRCUIT WITH CARRY REGENERATION

BACKGROUND OF THE INVENTION

This invention relates to electronic adder circuits and more particularly to an improved chain-type ripple-carry generating circuit used to propagate carry signals in parallel, binary adders.

Chain-type ripple-carry generating circuits having a plurality of cascaded stages each using a transmission gate for controlling the propagation of a carry signal through the stage are well known for having the advantages of fast carry propagation, simple circuit topology and compact layout in an integrated circuit. Typically, each stage of a chain-type carry circuit has an input terminal for receiving an input carry signal, an output terminal for providing an output carry signal, a transmission gate having its conduction path connected in series between the input and output terminals, a clocked load transistor having its conduction channel connected between the output terminal and a VDD supply terminal, and a carry-out logic network connected to the output terminal and responsive to an addend and an augend signal for providing an appropriate output carry signal.

Because each stage of the carry circuit introduces a series resistance and a parallel capacitance to the carry propagation path, the propagation delay of a carry signal through a carry circuit having a plurality of stages increases rapidly with the number of such stages. Furthermore, since carry propgation in a dynamic carry circuit occurs only during a fixed active interval, a carry signal after propagating through a long section of the carry circuit may be so delayed that its amplitude does not reach its final logic level before the end of active interval and accordingly appears attenuated. Therefore, an excessively long carry signal propagation delay in a dynamic carry circuit causes the problem of carry signal attenuation which imposes limitations on the minimum active interval of such circuits and the maximum number of stages which may be included in such circuits.

One prior art solution to the carry signal attenuation problem in chain-type carry circuits is to divide a long carry circuit into short sections and to interpose a buffer amplifier between these sections for restoring the full logic level of the carry signal after each section. However, this solution is deficient in that each non-inverting buffer amplifier adds approximately two gate delays to the carry signal propagation time through the carry circuit, and the buffer amplifiers themselves become a major source of carry signal propagation delay. Moreover, the addition of buffer amplifiers in a carry circuit increases its layout area when used in an integrated circuit and, consequently, increases the manufacturing cost of such an integrated circuit. Therefore, a need clearly exists for a solution to the carry signal attenuation problem in chain-type ripple-carry generating circuits which overcomes the deficiencies of the prior art by permitting shorter carry signal propagation delay and more compact layout when used in an integrated circuit.

SUMMARY OF THE INVENTION

Accordingly, the above and other deficiencies of the prior art are improved by the present invention which is a chain-type ripple-carry generating circuit comprising a plurality of cascaded stages in which at least one stage is provided with carry signal regeneration means comprising logic means coupled to receive the input carry signal and a clock signal and responsive to the input carry signal in the absence of the clock signal for providing an actuation signal. The carry signal regeneration means further comprising switching means coupled to the input terminal of the stage and responsive to the actuation signal for controllably coupling the input terminal to a potential at a first predetermined level. In an illustrative embodiment the logic means is a two-input NOR gate having one input coupled to the input terminal and the other input coupled to receive the clock signal. The switching means is a field effect transistor having its conduction channel coupled between the input terminal and ground and its gate electrode coupled to the output of the NOR gate. When the clock is at a logic "0" level and a logic "0" carry signal is received at the input terminal, the output of the NOR gate goes to a logic "1" level to drive the field-effect transistor into conduction and thereby pull the input terminal to substantially ground potential.

DETAILED DESCRIPTION

Figure 1:
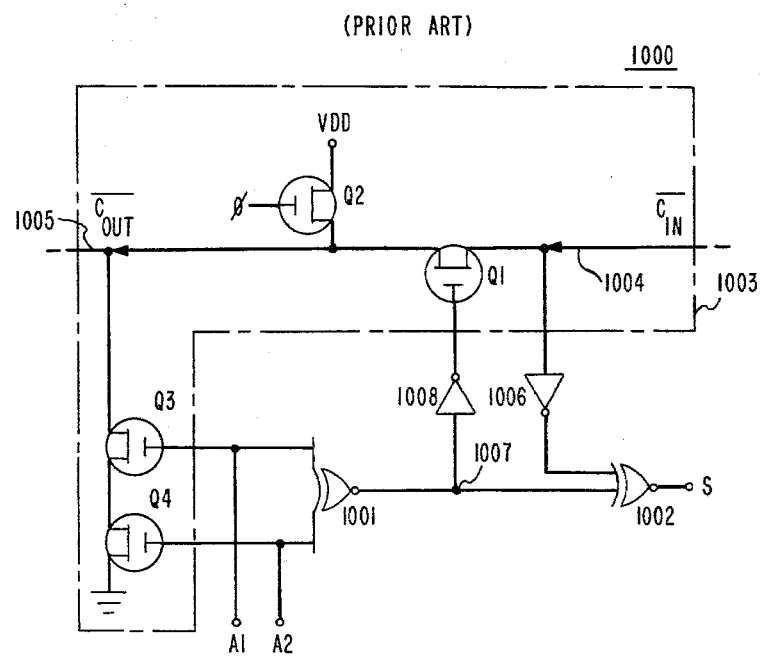
FIG. 1 is a schematic diagram depicting one section of a typical prior art parallel, binary adder including one stage of a chain-type ripple-carry generating circuit.

Referring now to FIG. 1 there is shown a schematic diagram illustrative of one section of a parallel, binary adder circuit 1000 implemented with metal-oxide-semiconductor (MOS) transistors. The adder section contains two EXCLUSIVE-NOR gate 1001 and 1002 and one stage 1003 of a chain-type ripple-carry generating circuit. The carry circuit stage 1003 includes an input terminal 1004 for receiving a carry-in-not bit $\overline{C}_{in}$, an output terminal 1005 for providing a carry-out-not bit $\overline{C}_{out}$, a transmission gate comprising transistor Q1 with its conduction channel connected in series between the input and output terminals, a clocked load transistor Q2 having its conduction channel connected between a VDD supply terminal and the output terminal, and a carry-out logic network comprising two transistors Q3 and Q4 having their channels connected in series between the output terminal and a ground terminal.

The carry circuit is periodically activated and deactivated by a precharge clock signal Φ applied to the gate of the load transistor Q2. During the interval when the Φ signal is at a logic "1" level, the carry circuit is inactive and transistor Q2 is in its conducting state pulling the output terminal 1005 to substantially VDD. During the intervals when the Φ signal is at a logic "0" level, the carry circuit is active and transistor Q2 is is its cutoff state to isolate the output terminal from the VDD supply terminal.

While the carry circuit is active, the adder section receives an augend bit A1 and an addend bit A2, of the same significance. Bits A1 and A2 are applied to the gates of transistors Q3 and Q4, respectively, of the carry-out logic network. When A1 and A2 are both at logic "1" levels, Q3 and Q4 are driven into their conducting states, and the output terminal is held at ground potential which is a logic "0" level. Thus the carry-out logic network performs the NAND logic function on bits A1 and A2. Bits A1 and A2 are also applied to the first EXCLUSIVE-NOR gate 1001 which computes and provides a partial sum bit at its output node 1007. The partial sum bit is then applied to the second EXCLUSIVE-NOR gate 1002 along with the $C_{in}$ bit complemented by an inverter 1006. The second EXCLUSIVE-NOR gate computes and provides the sum bit S.

The partial sum bit at node 1007 is complemented by another inverter 1008 and applied to the gate of the transmission gate transistor Q1. When the partial sum bit is at a logic "0" level, Q1 is driven into its conducting state to allow the $\overline{C}_{in}$ bit at the input terminal of the stage to pass to the output terminal of the stage. Therefore, a $\overline{C}_{in}$ bit is allowed to pass from the input to the output terminal when bits A1 and A2 are respectively at opposite logic states, under which conditions a logic "1" level is provided to the gate of Q1.

A carry signal propagating through a stage of the carry circuit encounters a series resistance consisting primarily of the on resistance of transistor Q1 and a parallel capacitance to ground consisting primarily of the sum of the gate to channel capacitance of Q1, the input capacitance of the inverter 1006 and stray capacitances associated with the source and drain of Q1, the source of Q2 and the drain of Q3. The combination of the series resistance and parallel capacitance in each stage causes the propagation delay of the carry-not bit through the carry circuit to increase rapidly with the number of stages in the carry circuit. Since the carry propagation can occur only during a fixed interval when the carry circuit is active, the time required for a carry-not bit to propagate through many stages of the carry circuit may exceed the duration of the fixed interval, and the carry-not bit after propagating through those stages may not be able to reach its full logic level before the end of the fixed interval. This results in an effective attenuation of the carry-not bit as it propagates, and for long carry circuits the logic level of the carry-not bit may be so degraded that it cannot be correctly detected by the adder section which receives that carry-not bit. Therefore, the propagation delay of the carry signal imposes undesirable limitations on the minimum active interval and on the maximum number of stages in a carry circuit.

Figure 2:
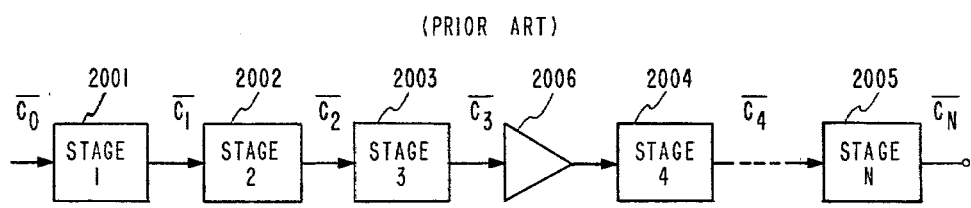
FIG. 2 is a block diagram depicting a prior art chain-type carry circuit using buffer amplifiers for restoring the carry signal logic levels.

Referring now to FIG. 2 there is shown a block diagram illustrating a prior art solution to the problem of carry signal attenuation in chain-type carry circuits. The blocks 2001 through 2005 represent N stages of a carry circuit, each stage having the configuration of the carry circuit stage 1003 as shown in FIG. 1. The carry circuit is divided into three-stage sections and a noninverting buffer amplifier is inserted after each section to restore the carry signal to its full logic level and thereby avoid the problems of carry signal attenuation. The buffer amplifier typically consists of two cascaded inverters and, therefore, introduces a propagation delay equivalent to that of two logic gates. Minimal delay through the entire prior art carry circuit is achieved by choosing the number of stages in each section to be such that the delay through the section approximately equals the delay of a buffer amplifier. Hence, the buffer amplifiers in an optimized prior art circuit account for approximately half the total delay in such a carry circuit.

Furthermore, the addition of buffer amplifiers also increases the layout area of the carry circuit in an integrated circuit. The increase arises not only from the areas of additional circuit elements of the buffer amplifiers themselves but also from the loss of layout simplicity afforded by a carry circuit having identical stages.

Figure 3:
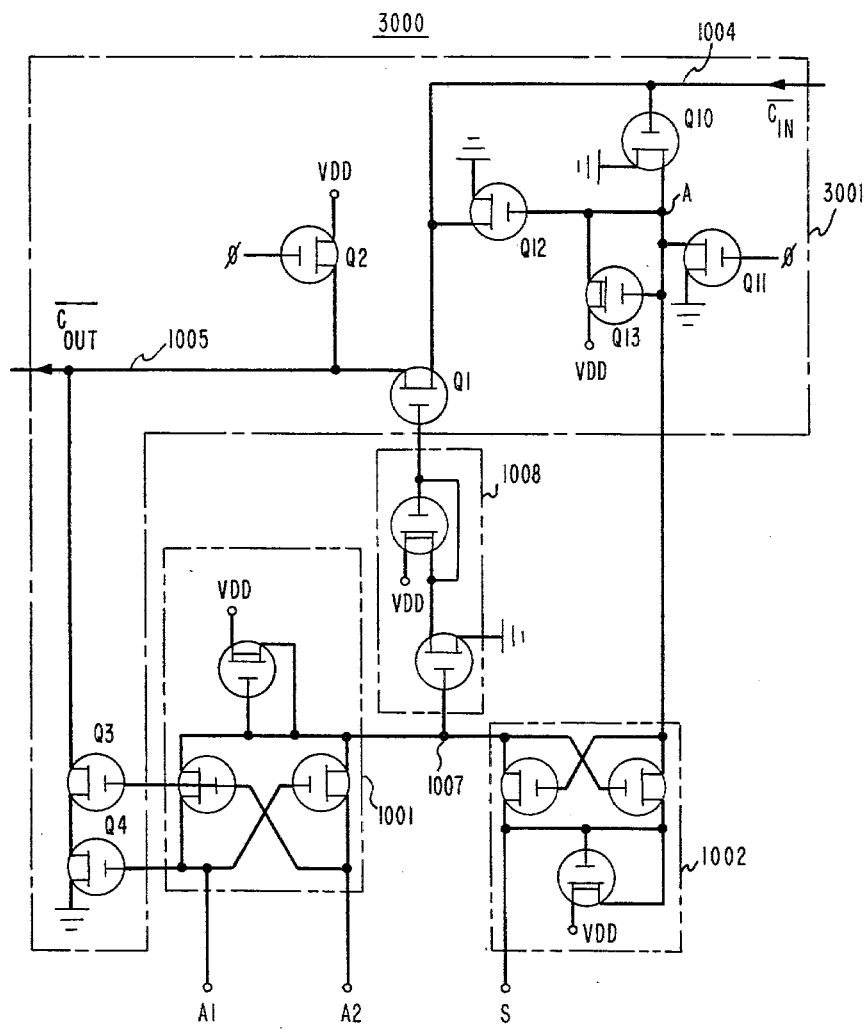
FIG. 3 is a schematic diagram depicting one section of a parallel, binary adder including one stage of a chain-type ripple-carry generating circuit according to the preferred embodiment of the present invention.

Turning now to FIG. 3 there is shown a schematic diagram depicting one section 3000 of a parallel adder including one stage 3001 of an improved carry circuit according to the preferred embodiment of the present invention. Reference characters used to refer to the components of the adder section in FIG. 1 are also being used to refer to corresponding components in FIG. 3. The adder section is implemented in n-channel MOS technology with depletion mode load transistors. The EXCLUSIVE-NOR gates 1001 and 1002 are of a known configuration as is the inverter 1008. The improvement in the carry circuit comprises the addition of a regeneration network in each stage for restoring the logic "0" level of a $\overline{C}_{in}$ bit to substantially its full logic level which in this case is ground potential. Because the input terminal of each stage is precharged to substantially full VDD potential by the load transistor of the immediately preceding stage prior to the activation of the carry circuit, the logic "1" level to a $\overline{C}_{in}$ signal requires no regeneration.

The regeneration network includes a NOR gate comprising transistors Q10, Q11, and Q13 which receives the $\Phi$ and $\overline{C}_{in}$ signals and performs the NOR logic function on those signals at node A. The NOR gate also serves to provide the complemented $\overline{C}_{in}$ bit to the second EXCLUSIVE-NOR gate 1002. When the carry circuit is inactive by virtue of $\Phi$ being at a logic "1" level, Q11 is driven into its conducting state pulling node A to ground and driving Q12 to its nonconducting state. When the carry circuit is in its active state by virtue of $\Phi$ being a logic "0" level and $\overline{C}_{in}$ is at a logic "1" level, Q11 is driven into its nonconducting state, but Q10 is driven into its conducting state. Under these conditions, node A is at substantially ground potential and Q12 is in its nonconducting state. However, if while the carry circuit is active, $\overline{C}_{in}$ goes to a sufficiently low level so as to cause node A to go to a level sufficiently high to drive Q12 into its conducting state, the input terminal 1004 is pulled by Q12 to substantially ground potential, which is the full logic "0" level. Thus, if the signal level at the input terminal falls below the logic "0" switching threshold level of the NOR gate, the regeneration network restores the signal level to substantially ground potential. The logic "0" switching threshold for the NOR gate is determined by the $\beta$ ratio of transistor Q13 and Q10 which may be adjusted to achieve a desired threshold level for a logic "0" state.

The regeneration network provides for restoration of the carry signal within a stage without interposing more logic gates along the carry propagation path. Additional delay is introduced only to the extent of increased capacitance across the input terminal from the connection of the regeneration network. Therefore, a carry circuit in accordance with the present invention is capable of faster carry propagation than one which uses buffer amplifiers for restoring the carry signal.

The preferred embodiment of the present invention includes a regeneration network in each stage of the carry circuit in order to derive the advantages of layout simplicity achievable with a carry circuit having identical stages. However, in many cases it is not necessary to provide carry signal regeneration in all stages in order to avoid the problems of carry signal attenuation, and in some instances it may be desirable, from the standpoint of reducing the number of elements in the carry circuit, to include the regeneration network in only as many stages as is necessary to keep the attenuation below a specified level. Usually, the additional layout area required to accommodate a regeneration network in every stage is more than offset by the layout area savings which can be derived from having a carry circuit with identical stages.

In some instances it may be desirable to have more than one transmission gate in each stage of the carry circuit. In such instances each transmission gate has its conduction path connected in series between the input and output terminals of the carry circuit.

Although in the described embodiment of the present invention, the carry signal propagated by the carry circuit is a carry-not ($\overline{C}$) bit, it will be obvious to one skilled in the art of logic circuit design that the principles of the present invention are also applicable with appropriate modifications to a carry circuit in which the propagated carry signal is a carry bit. In the latter case the regeneration network is modified to restore a degraded logic "1" level to substantially VDD potential.

It will be understood by those skilled in the art that the foregoing and other modifications and changes may be made to the described embodiment without departing from the spirit and scope of the invention. For example, circuits embodying the invention may also be implemented in other field-effect transistor technologies such as p-channel metal-oxide-semiconductor (PMOS) technology or complementary metal-oxide-semiconductor (CMOS) technology.

I claim:

1. A carry circuit comprising a plurality of stages, each stage including an input terminal adapted to receive an input carry signal, an output terminal adapted to provide an output carry signal;

first and second terminals adapted to receive a first and a second signal respectively;

a third terminal adapted to receive a potential at a first predetermined level;

a clock terminal adapted to receive a clock signal;

load means coupled to the output terminal and responsive to the clock signal for controllably setting the output terminal to a second predetermined level;

transmission gate means having a conduction path coupled in series between the input and output terminals and a control electrode, the transmission gate means being responsive to a control signal applied to the control electrode for providing a relatively low resistance across the conduction path;

first logic means coupled to the output terminal and responsive to the first and second signals for providing a carry signal to the output terminal;

second logic means coupled to the control electrode of the transmission gate means and responsive to only the first signal or only the second signal for providing the control signal;

characterized in that there are included in at least one stage regeneration means comprising third logic means responsive to the input carry signal in the absence of the clock signal for providing an actuation signal and switching means coupled to the input terminal and responsive to the actuation signal for controllably coupling the input terminal to the third terminal.

2. A carry circuit as recited in claim 1 wherein the first logic means include means for providing the NAND function at the output terminal, the second logic means include means for providing the EXCLUSIVE-OR function at the control electrode of the transmission gate means, further characterized in that the third logic means include means for providing the NOR function at the switching means.

3. A carry circuit as recited in claim 2 wherein each stage further comprises a fourth terminal adapted to recieve a potential at the second predetermined level, the load means comprise a first field effect transistor having a conduction channel coupled in series between the fourth terminal and the output terminal and a gate electrode coupled to the clock terminal, the transmission gate means comprise a second field effect transistor having a conduction channel coupled between the input and output terminals and a gate electrode coupled to the means for providing the EXCLUSIVE-OR function, further characterized in that the switching means comprise a third field effect transistor having a conduction channel coupled between the input terminal and the third terminal and a gate electrode coupled to the means providing the NOR function.

* * * * *